(12) United States Patent
Myron et al.

(10) Patent No.: US 12,518,439 B2
(45) Date of Patent: Jan. 6, 2026

(54) NOTIFICATION SYSTEM WITH EMOTION-INCITING IMAGE GENERATOR

(71) Applicant: T-Mobile USA, Inc., Bellevue, WA (US)

(72) Inventors: Peter P. Myron, Renton, WA (US); Michael J. Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 184 days.

(21) Appl. No.: 18/403,451

(22) Filed: Jan. 3, 2024

(65) Prior Publication Data
US 2025/0218057 A1  Jul. 3, 2025

(51) Int. Cl.
| | |
|---|---|
| G06T 11/60 | (2006.01) |
| G06N 3/0455 | (2023.01) |
| G06N 3/08 | (2023.01) |
| G06T 3/40 | (2006.01) |
| G06T 11/00 | (2006.01) |
| H04L 41/0686 | (2022.01) |
| G06F 40/205 | (2020.01) |
| G06F 40/30 | (2020.01) |

(52) U.S. Cl.
CPC .......... *G06T 11/00* (2013.01); *G06N 3/0455* (2023.01); *G06N 3/08* (2013.01); *G06T 3/40* (2013.01); *H04L 41/0686* (2013.01); *G06F 40/205* (2020.01); *G06F 40/30* (2020.01)

(58) Field of Classification Search
CPC ..... G06T 11/00; G06N 3/0455; G06F 40/205; H04L 41/0686
See application file for complete search history.

(56) References Cited

U.S. PATENT DOCUMENTS

| | | | | |
|---|---|---|---|---|
| 2018/0275853 | A1* | 9/2018 | Kozloski | G06F 40/186 |
| 2020/0005784 | A1* | 1/2020 | Vadackupurath Mani | |
| | | | | G06V 40/20 |
| 2025/0014245 | A1* | 1/2025 | Xu | H04L 51/10 |
| 2025/0218057 | A1* | 7/2025 | Myron | G06N 3/0455 |

FOREIGN PATENT DOCUMENTS

| | | | | | |
|---|---|---|---|---|---|
| CA | 3237882 | A1 * | 5/2023 | | G06F 40/169 |
| CN | 119075300 | A * | 12/2024 | | A63F 13/71 |
| CN | 120032409 | A * | 5/2025 | | |
| JP | 2024084340 | A * | 6/2024 | | |
| KR | 20250030760 | A * | 3/2025 | | G06N 3/0475 |
| KR | 102827159 | B1 * | 6/2025 | | G06T 11/00 |
| WO | WO-2022059817 | A1 * | 3/2022 | | H04N 21/488 |
| WO | WO-2025144466 | A1 * | 7/2025 | | G06Q 30/0231 |

* cited by examiner

*Primary Examiner* — Cheng Yuan Tseng
(74) *Attorney, Agent, or Firm* — Lee & Hayes, P.C.

(57) ABSTRACT

Techniques for generating notifications with emotion-inciting images based on the context of report data, are discussed herein. A notification system may configure components and models to receive report data and analyze the report data for context data. The context data may include contextual information associated with the report data and/or a report recipient. The system may generate an image text prompt based on the context data. The system may use the image text prompt as input for an artificial intelligence (AI) image generator and receive an emotion-inciting image as output. The system may generate a notification for the report data and transmit the notification with the emotion-inciting image.

20 Claims, 6 Drawing Sheets

NOTIFICATION SYSTEM WITH EMOTION-INCITING IMAGE GENERATOR

BACKGROUND

Traditionally, a notification system for data services may report issues or performance metrics by sending report data to a list of designated recipients. The notification system may generate notifications with graphs and metrics to highlight relevant report data. However, a recipient who receives report data infrequently or is not well-trained in reading output graphs and metrics may miss the key takeaway of the report data. Additionally, even if the recipient is well-trained and receives report data frequently, the recipient may be experiencing data fatigue. Thus, the recipient may fail to respond to the notification with an appropriate level of urgency.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
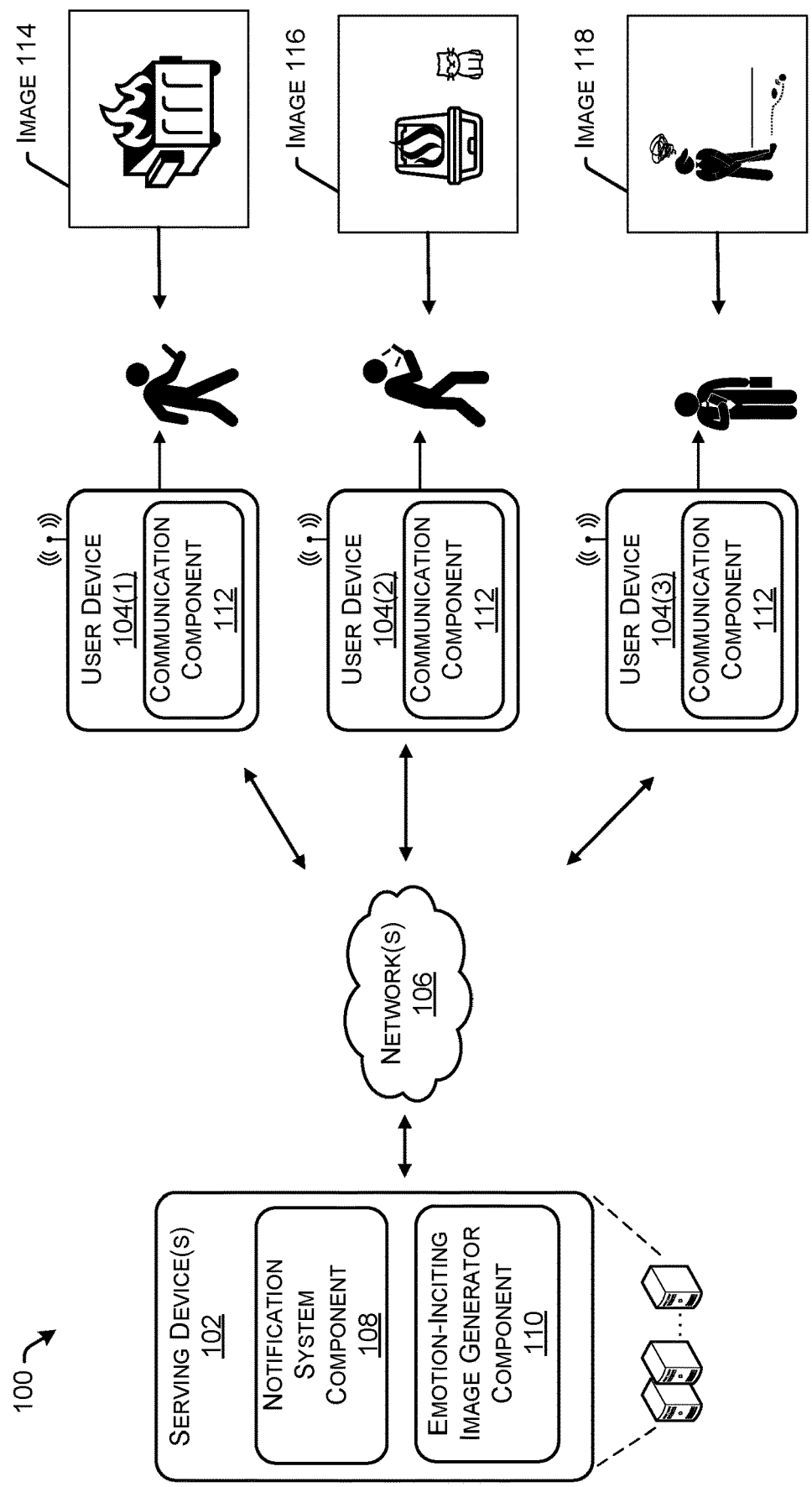
FIG. 1 illustrates an example system, including a notification system configured with components for generating notifications with emotion-inciting images based on the context of report data.

Systems, devices, and methods are directed to a notification system configured with components to generate notifications with emotion-inciting images based on the context of report data. The present notification system may receive and analyze report data from any domain to determine contextual information. The system may generate an emotion-inciting image based on the contextual information. The system may transmit a notification for the report data with the emotion-inciting image. An emotion-inciting image is an image composed by the system to evoke an emotional response and/or incite action from an intended recipient. The notification system may be a standalone application or incorporated as a part of any data reporting application.

In various examples, the notification system may configure components to parse the report data for context data and generate an emotion-inciting image based on the context data. The context data may include any contextual information associated with the content of the report data. The system may generate a notification alert for the report data and transmit the emotion-inciting image with the notification alert.

In some examples, the notification system may receive the report data, identify an intended recipient ("notification subscriber") for the report data, and transmit the notification alert to the intended recipient. Examples of the report data may include, but are not limited to, network performance data, customer service data, air quality data, stock market profiles, political statistics, climate change data, and the like. Notifications for the report data may be triggered manually by a user (e.g., team lead, network admin, etc.) and/or automatically in response to notification trigger conditions. The notification trigger conditions may include conditions based on predetermined data thresholds (e.g., percentage of system failure, data transmission rate falling below a threshold, etc.), meeting a set of conditions (e.g., completion of a group of tasks), and/or time intervals (e.g., biweekly, quarter, etc.). The system may configure components, including an emotion-inciting image-generating model ("image-generating model") to parse the report data, determine the context data based on the report data, and generate an emotion-inciting image to transmit with the notification.

In various examples, the image-generating model may train one or more machine learning (ML) models, including a text parser, to analyze the report data and determine context data associated with the content of the report data. The context data may include any data associated with contextual information or content of the report data. Examples of the context data may include but are not limited to, alert context, subscriber context, tone, severity level, notification policy, and the like. In some examples, the context data may also include external contextual information that the system may look up based on codes or identifiers. Examples of external contextual information may include a department type based on a group or team code in the report data, subscriber information based on a subscriber account, notification priority based on notification rules, and the like.

In some examples, the text parser may analyze the content of the report data for contextual information. The contextual information may include an alert context of the report data. Examples of the alert context may include, but are not limited to: report type, report audience, domain, department information, and the like. In some examples, the contextual information may also include a tone of the content, wherein the tone may indicate a positive tone, a neutral tone, or a negative tone. In additional examples, the contextual information may include a severity level of the content. The severity level may be determined based on comparing metrics in the report data to predetermined threshold values (e.g., a metric meets or exceeds 50), predetermined threshold ranges (e.g., a metric falls between 10 and 20), or historical value (e.g., a metric is higher than a previously recorded metric). The severity level may be expressed as a relative term including, but not limited to, extreme, strong, moderate, mild, weak, and the like. In various examples, the image-generating model may use the contextual information of the report data to generate an image text prompt. The system may input the image text prompt with an artificial intelligence (AI) image generator and receive an emotion-inciting image as output.

In some examples, the system may access a subscriber database to retrieve information associated with the subscriber to provide subscriber context for image generation. The system may identify a subscriber account ("user account") associated with a notification subscriber from a list of notification subscribers and determine user data from the user account. In various examples, the system may include the user data ("subscriber context") with the context data. The user data may include, but is not limited to, user hobby, user interest, job title, notification priority (e.g., primary on-call, secondary on-call, etc.), and the like.

The image-generating model may use any portion of the context data to generate an image text prompt. In some examples, the image-generating model may use any portion of the context data, including one or more of the alert context, the subscriber context, the tone, and the severity level for generating an image text prompt. The image-generating model may use the image text prompt as input for an AI image generator and receive an emotion-inciting image as output. The system may determine to transmit a notification with the emotion-inciting image to a subscriber.

The system may determine a preferred communication method associated with the subscriber to transmit the notification. In various examples, the system may identify a subscriber from a list of notification subscribers and determine a preferred communication method for the subscriber. In additional examples, the system may select a communication method for individual subscribers on the list of notification subscribers based on a notification priority. For example, a primary on-call subscriber may receive a text and email notification, while a secondary on-call subscriber may receive an email notification. In some examples, the system may determine to personalize the generated image only for the primary on-call subscriber. In additional examples, the system may determine to downgrade an image quality based on communication method. For example, if a subscriber is being notified via text, the system may transmit a lower-quality image.

By way of example and without limitation, the techniques discussed herein can be implemented on a notification system configured to receive and transmit report data to a user associated with the notification system in response to the user subscribing to the notification system. In various examples, the user may create a user account and add the user context ("subscriber context") to a subscriber database for the system to generate personalized images. The user may also provide contact information for the system to send notifications to the user. In some examples, the system may include a feedback system to prompt the user to provide user feedback for the generated image and/or to rate whether the generated image was appropriate content. Example user feedback may include, but is not limited to: negative feedback, positive feedback, incorrect severity level, incorrect tone, inappropriate image, and the like. The system may collect user feedback to retrain the ML models to improve on generating image text prompts.

The systems, devices, and techniques described herein can improve the functioning of the notification system by analyzing report data and generating an image to evoke a corresponding level of emotion for a notification alert. As described herein, the system may train one or more machine learning (ML) models to: (1) analyze the content of the report data, (2) determine contextualized data from the content, (3) generate image text prompts using the contextualized data, and/or (4) generate emotion-inciting images using the image text prompts. The emotion-inciting images are included with notification alerts to evoke a corresponding level of emotion or incite action in response to the report data. The system may transmit the notification with the emotion-inciting image. As a result, the emotion-inciting image may enable the notification system to provide data reports that are not only more inclusive and accessible to all recipients, but the recipients may also react faster to ameliorate any system issues. For instance, a user of the recipients may be subjected to less data fatigue from needing to first decipher the severity level of any reported issues in the notification before reading the report data. Additionally, the user may not be trained or informed on how to read certain graphs or metrics and may miss the importance of the report data.

The present system may use user feedback to continuously train and retrain the ML models to improve the process of generating emotion-invoking images. For example, the systems, devices, and techniques can include prompts for user feedback with the notifications and store the user feedback with any associated generated data (e.g., context data, image text prompt, etc.) as training data for retraining the ML models. Additionally, as described herein, the system may send notification alerts with emotion-inciting images to users in response network outages, by using the emotion-inciting images to incite action, the notification system may enable faster response to correct network failure and thus improve network performance. These and other improvements to the functioning of a computer and network are discussed herein.

The systems, devices, and techniques described herein can be implemented in a number of ways. Example implementations are provided below with reference to the following figures.

FIG. 1 illustrates an example environment 100, including a notification system configured with components for generating notifications with emotion-inciting images based on the context of report data, as described herein. The example environment 100 may include one or more serving device(s) 102 communicating with one or more of a user device(s) 104(1), a user device(s) 104(2), and a user device(s) 104(3), (collectively referred to as user devices 104) via one or more network(s) 106.

In some examples, the serving device(s) 102 can include a notification system component 108 and an emotion-inciting image generator component 110. In some examples, the notification system component 108 and the emotion-inciting image generator component 110 may receive report data, determine context data from the report data, and generate an emotion-inciting image based on the context data.

The notification system component 108 may receive report data and determine one or more user devices 104 to transmit a notification for the report data. The notification system component 108 may be a standalone application or incorporated as a part of any data reporting application. The notification system component 108 may receive and analyze report data from any domain. In some examples, the notification system component 108 may receive report data and determine to transmit the report data to a user device 104 associated with a notification subscriber ("user") from a list of notification subscribers. The report data may be received as internal data generated by the present system and/or as external data from an external data reporting system. The report data may include any output data from any data reporting system. Examples of the report data may include, but are not limited to: network performance data, customer service data, air quality data, stock market profiles, political statistics, climate change data, and the like. A notification alert including the report data may be triggered manually by a user (e.g., team lead, network admin, etc.) and/or automatically in response to notification trigger conditions. The notification trigger conditions may include conditions based on predetermined data thresholds (e.g., percentage of system failure, data transmission rate falling below a threshold, etc.), meeting a set of conditions (e.g., completion of a group of tasks), and/or time intervals (e.g., biweekly, quarter, etc.). As described herein, the notification system component 108 may receive the report data, and the emotion-inciting image generator component 110 may parse the report data for context and generate an emotion-inciting image based on the context. The notification system component 108 may generate a notification for the report data and transmit the emotion-inciting image with the notification.

The emotion-inciting image generator component 110 may receive and analyze the content of the report data. In various examples, the emotion-inciting image generator component 110 may train one or more machine learning (ML) models, including a text parser. In some examples, the text parser may analyze the content of the report data and determine context data. The context data may include any data associated with contextual information of the report data and may include but is not limited to: alert context, subscriber context, tone, severity level, notification policy, and the like.

The emotion-inciting image generator component 110 may determine a portion of the context data based on the content of the report data. In some examples, the context data may include alert context. Examples of the alert context may include, but are not limited to: report type, report audience, department information, and the like. In some examples, the emotion-inciting image generator component 110 may parse the content and determine an interpreted tone ("tone") based on the overall content. The tone may indicate a positive tone, a neutral tone, or a negative tone. In additional examples, the emotion-inciting image generator component 110 may determine a severity level associated with the content and/or tone. The severity level may be determined based on comparing a metric in the report data to predetermined threshold values (e.g., a metric meets or exceeds 50), predetermined threshold ranges (e.g., a metric falls between 10 and 20), or historical value (e.g., a metric is higher than a previously recorded metric). The severity level may be expressed as a relative term including, but not limited to, extreme, strong, moderate, mild, weak, and the like. Although the tone and the severity level may be individually described and determined outside of the context data, it is to be understood that the context data includes the tone and the severity level.

In some examples, the emotion-inciting image generator component 110 may use the contextual information of the report data to generate an image text prompt. In additional examples, the emotion-inciting image generator component 110 may use the image text prompt as input for an artificial intelligence (AI) image generator and receive an emotion-inciting image as output. The AI image generator may be an internal component or a third-party component.

In some examples, the emotion-inciting image generator component 110 and the notification system component 108 may access a subscriber database to retrieve information associated with a subscriber to provide user context for image generation. The notification system component 108 may determine a user account associated with the notification subscriber and retrieve associated user data from the subscriber database. In various examples, the emotion-inciting image generator component 110 may include the user data with the context data. The user data may include, but is not limited to, user hobby, user interest, job title, notification priority (e.g., primary on-call, secondary on-call, etc.), and the like.

The emotion-inciting image generator component 110 may use the context data to generate an image text prompt. In various examples, the emotion-inciting image generator component 110 may determine to use any portion of the context data, including any portion of the alert context, the user context, the tone, and/or the severity level, to generate an image text prompt.

The emotion-inciting image generator component 110 and the notification system component 108 may use the image text prompt as input for an AI image generator and receive an emotion-inciting image. The notification system component 108 may generate a notification for the subscriber and include the emotion-inciting image.

The notification system component 108 may determine one or more communication methods associated with the subscriber to transmit the notification. The notification system component 108 may identify one or more notification subscribers for the report data. As described herein, the notification system component 108 may access a subscriber database, determine a user account associated with an individual notification subscriber, and retrieve associated user data from the subscriber database.

In additional examples, the notification system component 108 may select a communication method for the subscriber based on a notification priority. For example, a primary on-call user may receive a text notification, while a secondary on-call user may receive an email notification. In some examples, the notification system component 108 may determine to personalize the image only for the primary on-call user.

In various examples, the notification system component 108 may determine to downgrade an image quality based on communication method. For example, if the user is being notified by text, the system may downgrade the emotion-inciting image and transmit a lower-resolution image. In some examples, the notification system component 108 may determine to notify a primary subscriber by text and email and may downgrade the image for text.

In some instances, a user device 104(1), a user device 104(2), and a user device 104(3) can include a communication component 112. In general, the user device(s) 104 can receive and transmit data from any applications or communications. The applications may include any category of applications, including calendar, email, phone book, data portal, messenger, social networking, media player, finance, fitness, lifestyle, and the like. The communications may be included with applications and may be functions native to phones, including voice communications, video communications, texts, and the like.

In some instances, the user device(s) 104 can receive and transmit data, as discussed herein, independent of conducting any communications via the network(s) 106 with the serving device(s) 102. As can be understood, the example environment 100 is not limited to the user device 104(1), the user device 104(2), and the user device 104(3) for receiving and transmitting data, and any number of device(s) can be utilized, as discussed herein. For instance, the functionality of the user device 104(1), the user device 104(2), and the user device 104(3) may be implemented as any user device 104 capable of receiving and/or transmitting messages, notifications, and/or storing various applications (e.g., email, calendar, notification applications, etc.). Additionally, as can be understood, references of a "user" may be the user, user profile, user data, and/or user account associated with the notification subscriber.

The communication component 112 can include functionality to receive and transmit data from the serving device(s) 102. The data may be received from the notification system component 108 of the serving device(s) 102. In some examples, the communication component 112 may receive data from the user input and transmit the data to the serving device(s) 102.

Examples of the user device(s) 104 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user device(s) 104 may include but are not limited to, smart devices such as smart watches, televisions, refrigerators, picture frames, washing machines, dryers, smart mirrors, or any other electronic appliances that can generate, request, receive, transmit, or display notifications, video, and/or digital data over a network.

The user device(s) 104 can communicate with other user device(s) 104 and/or one or more serving device(s) 102 via one or more network(s) 106. In some instances, the user device(s) 104 can communicate with any number of user devices, servers, serving devices, computing devices, and the like.

In some instances, the serving device(s) 102 can be implemented as one or more communication servers to facilitate communications by and between the various devices in the environment 100. That is, the serving device(s) 102 can represent any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the serving device(s) 102 may implement GSM, UMTS, LTE/LTE Advanced, and/or NR telecommunications technologies. In some instances, telecommunication technologies can be referred to generally as radio access technology. Thus, a 5G network can represent a 5G radio access technology.

While FIG. 1 illustrates the serving device(s) 102, it is understood in the context of this document that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 106 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In a non-limiting example, the example environment 100 illustrates a notification system including serving device(s) 102 sending notifications with example emotion-inciting images 114, 116, and 118 to corresponding example user devices 104(1), 104(2), and 104(3).

In the present example, the serving device(s) 102 configured the notification system component 108 and the emotion-inciting image generator component 110 to receive report data, determine context data from the report data, and generate emotion-inciting images based on the context data.

The notification system component 108 can determine notification recipients based on the report data and retrieve user information from a subscriber database. The emotion-inciting image generator component 110 can determine user context from the user information and apply the user context to generate emotion-inciting images contextualized for intended recipients. If the user information lacks user context, the emotion-inciting image generator component 110 may generate non-user specific images based on the content of the report data.

In the first example, the system determines the user account associated with the example user device 104(1) fails to provide additional user context. The emotion-inciting image generator component 110 determines the context data indicating the alert context as network status, the tone as negative tone, and the severity level as high. The emotion-inciting image generator component 110 can use the context data to generate the image text prompt as "large dumpster fire." The notification system component 108 transmits the notification with the example emotion-inciting image 114 to the example user device 104(1). The example emotion-inciting image 114 illustrates a dumpster fire with the report data to incite action from the user for repairing a total network failure.

In a second example, the system may determine the user account associated with the example user device 104(2) indicates the user context includes a love for cats and may generate a user-specific image for a cat lover. The emotion-inciting image generator component 110 can determine context data indicating the user context as a cat lover, the alert context as network status, the tone as negative tone, and the severity level as high. The emotion-inciting image generator component 110 can use the context data to generate the image text prompt as "angry cat beside a litter box that is on fire." The notification system component 108 transmits the notification with the example emotion-inciting images 116 to the example user device 104(2). The example emotion-inciting image 116 illustrates an angry cat sitting next to a burning litter box with the report data to incite action from the user for repairing a massive system slowdown.

In a third example, the system may determine the user account associated with the example user device 104(3) includes the user context indicating a love for golfing. The system may apply the user context to generate a user-specific image in the context of golfing. In the present examples, the emotion-inciting image generator component 110 can determine that the context data includes the user context as golfing, the alert context as a quarterly report, the tone as negative tone, and the severity level as moderate. The emotion-inciting image generator component 110 can use the context data to generate the image text prompt as "annoyed golfer missing a putt." The notification system component 108 transmits the notification with the example emotion-inciting image 118 to the example user device 104(3). The example emotion-inciting image 118 illustrates an annoyed golfer missing a putt with the report data to incite action from the user for a quarterly report missing a target metric.

Figure 2:
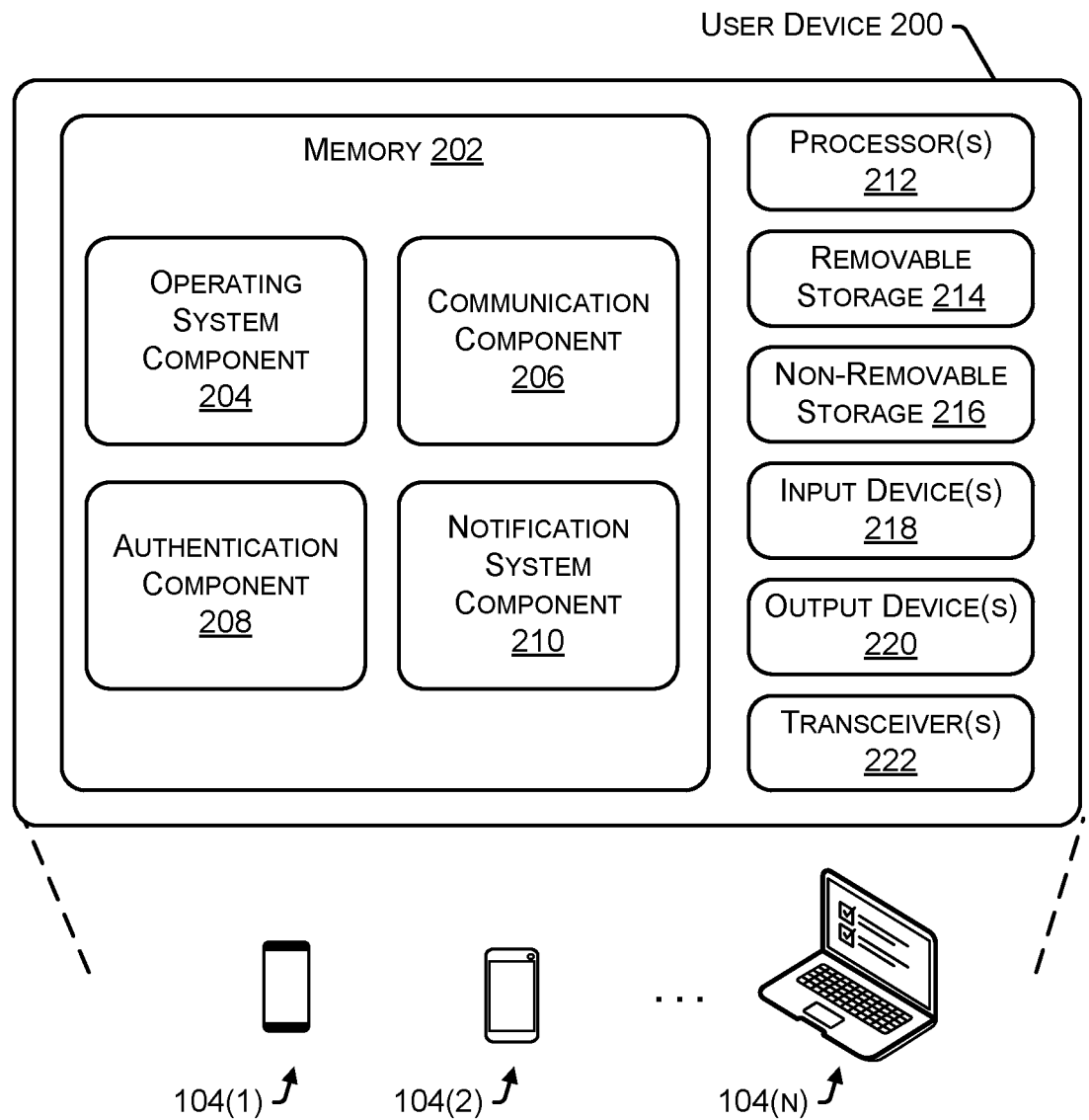
FIG. 2 illustrates an example user device configured to receive and present notifications with emotion-inciting images from the notification system.

FIG. 2 illustrates an example user device 200 configured to receive and present notifications with emotion-inciting images from the notification system, in accordance with embodiments of the disclosure. In some embodiments, the user device 200 can correspond to the user device 104(1), the user device 104(2), and the user device 104(3) of FIG. 1. It is to be understood in the context of this disclosure that the user device 200 can be implemented as a single device or as a plurality of devices with components and data distributed among them. By way of example, and without limitation, the user device 200 can be implemented as various user devices 104(1), 104(2), . . . , 104(N).

As illustrated, the user device 200 comprises a memory 202 storing an operating system component 204, a communication component 206, an authentication component 208, and a notification system component 210. Also, the user device 200 includes processor(s) 212, removable storage 214 and non-removable storage 216, input device(s) 218, output device(s) 220, and transceiver(s) 222.

In various embodiments, memory 202 is volatile (such as RAM), nonvolatile (such as ROM, flash memory, etc.), or some combination of the two. The operating system component 204, the communication component 206, the authentication component 208, and the notification system component 210 stored in the memory 202 can comprise methods, threads, processes, applications, or any other sort of executable instructions. The operating system component 204, the communication component 206, the authentication component 208, and the notification system component 210 can also include files and databases.

The operating system component 204 can include functionality to instruct the software or hardware to gather and transmit data associated with a user and/or user profile of the user device 200, for example. In some instances, the operating system component 204 can include a first API to provide data to the authentication component 208 and the notification system component 210. In some instances, the operating system component 204 can include a second API to issue instructions to software or hardware associated with a modem or the transceiver(s) 222 and to receive data from and/or transmit data to other user device 200 or serving device 300.

In some examples, the communication component 206 can conduct electronic communications (e.g., phone calls, video chats, etc.) and store data related to electronic communication for the notification system component 210. In various examples, the communication component 206 and the notification system component 210 may determine when to transmit data to the serving device 300 for analysis.

In some instances, the communication component 206 can correspond to the communication component 112 of FIG. 1.

The authentication component 208 can include functionality for a user associated with the user device 200 to register a user account and authenticate the user account for network access. In some examples, the authentication component 208 can generate and present a user interface for a user to create a user account and provide user information. In various examples, the authentication component 208 can interface with an authentication component 308 residing on the serving device 300 and access a user portal to register the user account and authenticate the user device and/or user account for service access. In some examples, the authentication component 208 may prompt for user input for user information. In various examples, the authentication component 208 may allow the user to register the user account as a notification subscriber for data reports associated with a specific team or group and add the user account to a list of notification subscribers for the specific team or group.

The notification system component 210 can include functionality to present notification alerts. In some examples, the notification system component 210 may receive notification alerts from the serving device 300. A notification alert ("notification") includes an emotion-inciting image and may include the report data and/or a hyperlink to access the report data. In some examples, the notification system component 210 may receive the notification and present the notification with the emotion-inciting image on a native communication application (e.g., text message) or a user interface generated by a standalone notification system application. In various examples, the notification system component 310 on the serving device 300 may cause the notification system component 210 to present, via a display of the user device 200, a user interface with the notification with the emotion-inciting image.

The notification system component 210 can include functionality to receive user input associated with user feedback in response to the notification and to send the user feedback to a serving device. In various examples, the notification system component 210 can send the user feedback with the notification to a serving device to train models to determine whether the image and/or prompt generated was appropriate for the notification. As described herein, the system may include a feedback system to prompt user input for user feedback to rate whether the generated emotion-inciting image was appropriate for the content of the report data. In a non-limiting example, the user feedback may include but is not limited to: negative feedback, positive feedback, incorrect severity level, incorrect tone, inappropriate image, and the like. The notification system component 210 may transmit any user feedback with notification data to the notification system component 310 on the serving device 300, and the serving device 300 may collect the user feedback and notification data to retrain ML models to improve the process for generating image text prompts.

The notification system component 210 may include rules to implement functionality for prioritizing receiving notifications, including changing do-not-disturb notification settings, placing texts in a favorites list, adding emails to allowlists, allowing electronic communications, authorizing web service access, and the like. In various examples, the notification system component 210 may interact with authentication component 208 to implement the rules or notifications based on whether the user accepted the rules.

Figure 4:
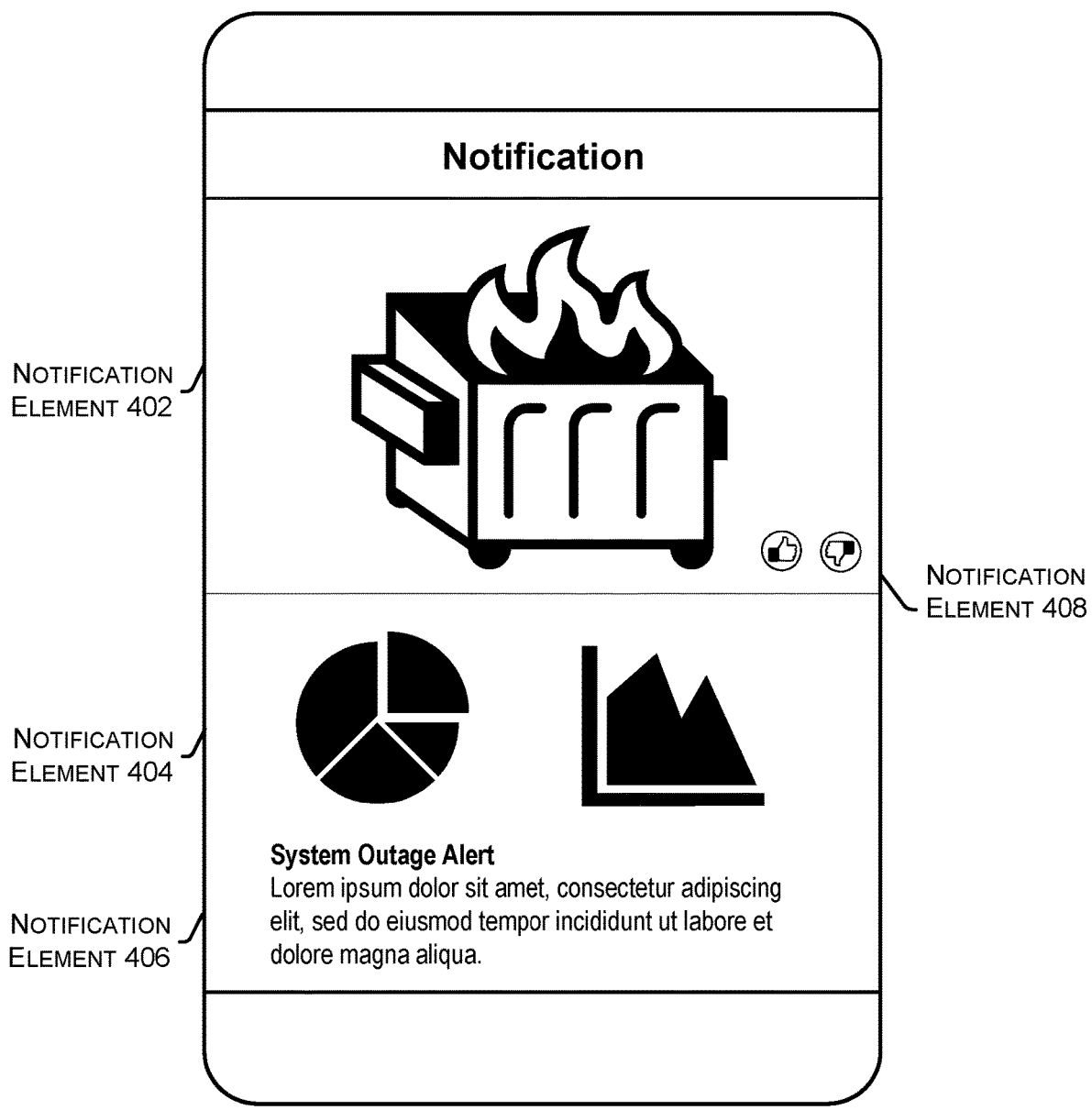
FIG. 4 illustrates an example user interface presenting a notification, including an emotion-inciting image generated by the notification system.

In some instances, the notification system component 210 can generate visualization for notification as described herein with respect to FIG. 4.

In some embodiments, the processor(s) 212 is a central processing unit (CPU), a graphics processing unit (GPU), or both CPU and GPU, or other processing unit or component known in the art.

The user device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and nonvolatile, removable, and non-removable media implemented in any method or technology for storage of information, such as computer-readable instructions, data structures, program modules, or other data. Memory 202, removable storage 214, and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user device 200. Any such tangible computer-readable media can be part of the user device 200.

In various embodiments, the user device 200 can include applications including, but not limited to, a web browser application, a network access application, a notification application, and the like. During execution on the user device(s) 104 and 200, each of the applications may be configured to cause the user device(s) 104 and 200 to initiate data communications with the serving device(s) 102 and 300 over the network(s) 106.

The user device(s) 104 may be configured to communicate over a telecommunications network using any common wireless and/or wired network access technology. Moreover, the user device(s) 104 may be configured to run any compatible device operating system (OS), including but not limited to, Microsoft Windows Mobile, Google Android, Apple iOS, and Linux Mobile, as well as any other common mobile device OS.

The user device 200 also can include input device(s) 218, such as a keypad, a cursor control, a touch-sensitive display, voice input device, etc., and output device(s) 220, such as a display, speakers, printers, etc. These devices are well-known in the art and need not be discussed at length here.

As illustrated in FIG. 2, the user device 200 also includes one or more wired or wireless transceiver(s) 222. For example, the transceiver(s) 222 can include a network interface card (NIC), a network adapter, a LAN adapter, or a physical, virtual, or logical address to connect to various network(s) 106 or to the serving device(s) 102, for example. To increase throughput when exchanging wireless data, the transceiver(s) 222 can utilize multiple-input/multiple-output (MIMO) technology. The transceiver(s) 222 can comprise any sort of wireless transceiver(s) capable of engaging in wireless radio frequency (RF) communication. The transceiver(s) 222 can also include other wireless modems, such as a modem for engaging in Wi-Fi, WiMax, Bluetooth, infrared communication, and the like.

Figure 3:
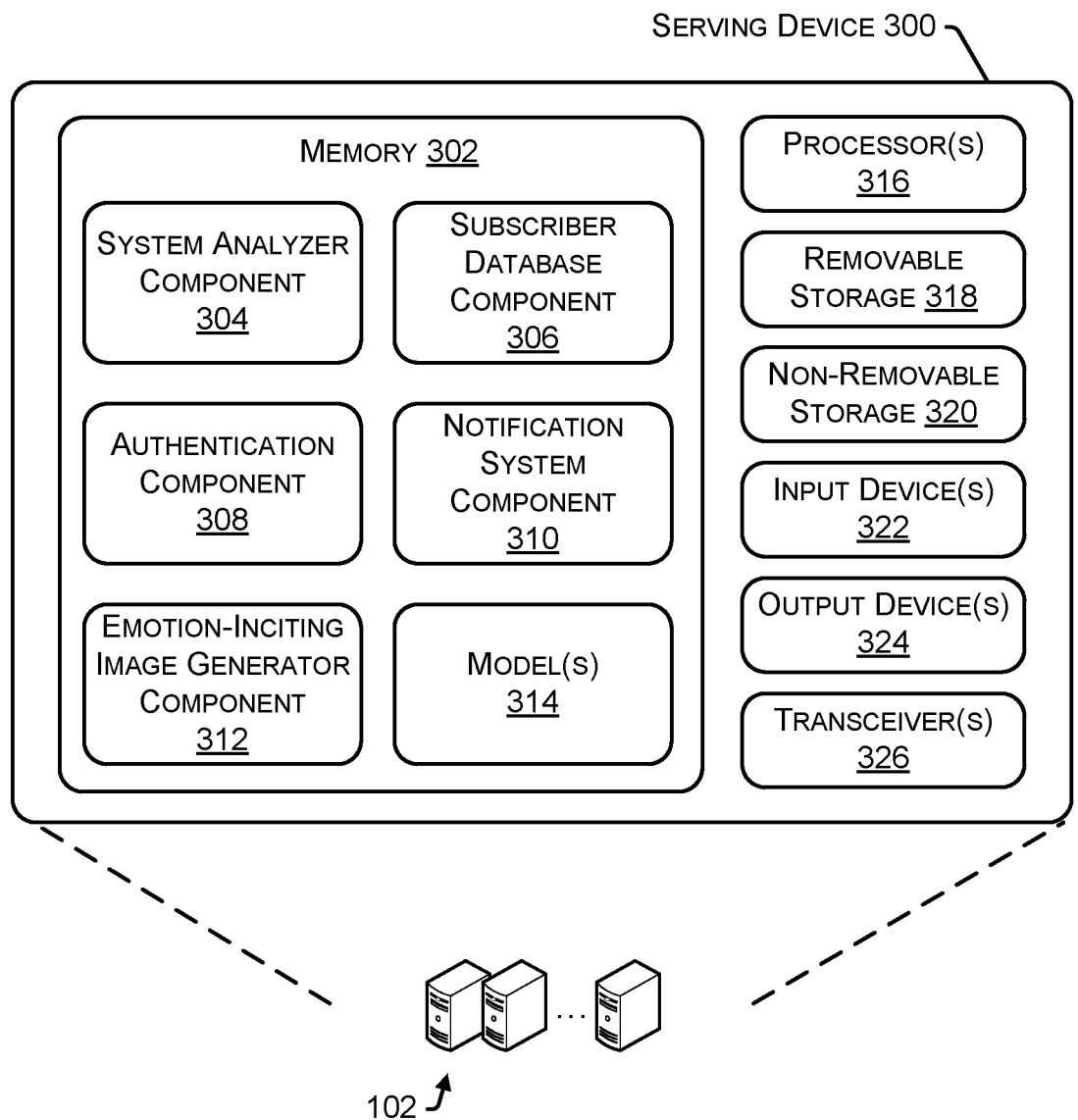
FIG. 3 illustrates an example serving device configured to implement the notification system, including components for generating notifications with emotion-inciting images based on the context of report data.

FIG. 3 illustrates an example serving device 300 configured to implement the notification system, including components for generating notifications with emotion-inciting images based on the context of report data, in accordance with embodiments of the disclosure. In some embodiments, the serving device 300 can correspond to the serving device(s) 102 of FIG. 1. It is to be understood in the context of this disclosure that the serving device 300 can be implemented as a single device or as a plurality of devices with components and data distributed among them.

As illustrated, the serving device 300 comprises a memory 302 storing a system analyzer component 304, a subscriber database component 306, an authentication component 308, a notification system component 310, an emotion-inciting image generator component 312, and model(s) 314. Also, the serving device 300 includes processor(s) 316, removable storage 318, and non-removable storage 320, input device(s) 322, output device(s) 324, and transceiver(s) 326.

In various embodiments, the memory 302 is volatile (such as RAM), nonvolatile (such as ROM, flash memory, etc.), or some combination of the two. The system analyzer component 304, the subscriber database component 306, the authentication component 308, the notification system component 310, the emotion-inciting image generator component 312, and the model(s) 314 stored in the memory 302 can comprise methods, threads, processes, applications or any other sort of executable instructions. The system analyzer component 304, the subscriber database component 306 the authentication component 308, the notification system component 310, the emotion-inciting image generator component 312, and the model(s) 314 can also include files and databases.

The system analyzer component 304 can include functionality to receive and aggregate data, as discussed herein. The system analyzer component 304 may receive data from internal data generated by the present system and/or as external data from an external data reporting system. The system analyzer component 304 may aggregate data as report data. The report data may include any data and/or metrics received and/or captured by any data reporting system. Examples of the report data may include, but is not limited to, network performance data, customer service data, air quality data, stock market profiles, political statistics, climate change data, and the like. The system analyzer component 304 may include functionality to trigger an output of the report data. The triggering of the output may be caused by a manual trigger by a user (e.g., data analyst, team lead, etc.) and/or an automatic trigger in response to meeting one or more notification trigger conditions. The system analyzer component 304 may store the notification trigger conditions, which may include conditions based on data thresholds (e.g., percentage of system failure, data transmission rate falling below a value, etc.), meeting a set of conditions (e.g., completion of a set of tasks), and/or time intervals (e.g., biweekly, quarter, etc.). The system analyzer component 304 may receive user input configuring the notification trigger conditions. In some examples, the system analyzer component 304 may receive notification trigger conditions from device manufacturers (e.g., hardware error message).

In some instances, the system analyzer component 304 can receive a plurality of report data and store the report data in a database. In some instances, the report data can be indexed by location, data type, time, group identifier, and the like. In various examples, the system analyzer component 304 can aggregate the report data by any index (e.g., annually, domains, groups, or group identifier, departments, etc.).

In some instances, the system analyzer component 304 can perform any statistical analysis on the metrics of the report data to determine a variety of corresponding data and/or values. The system analyzer component 304 can aggregate report data based on domain, data type, and/or aggregation scheme. A domain may include any industry, field, discipline, and/or knowledge domains and may include, but is not limited to: network management, finance market, consumer market, climate system, and the like. As described herein, example data types for report data may include, but are not limited to: network performance data, customer service data, air quality data, stock market profiles, political statistics, climate change data, and the like. In a first non-limiting example, in a network management setting, the system analyzer component 304 can aggregate report data, including metrics for network performance during times throughout the week. In the present example, using report data, the system analyzer component 304 can determine, based on the calendar data, that the network decreased in performance in accordance with historical data for a similar time a week ago. In a second non-limiting example, within a climate change data setting, the system analyzer component 304 can aggregate climate data, including metrics for the temperature of specific locations at times throughout the year. Using the climate data, the system analyzer component 304 can determine, based on calendar data, that the temperature for a particular location is on a rising trend.

The system analyzer component 304 can analyze report data and determine context data. In some examples, the system analyzer component 304 may store metrics ("data values") templates to identify metrics and associated values that provide relevant information in the content of the report data for contextual information. In additional examples, the metrics templates may include rules or formulas to apply the associated values to for determining whether the data indicate a negative or positive trend and/or severity levels. In additional examples, the system analyzer component 304 may analyze any data trends, behavior patterns, or correlated data to determine significance and/or provide additional context data ("context data"). The context data may include any data associated with contextual information of the report data and may include but is not limited to: alert context, tone, severity level, notification policy, and the like. Examples of the alert context may include, but are not limited to: domain, report type, report audience, department information, and the like. In some examples, the system analyzer component 304 can determine an interpreted tone ("tone") based on the context data. The tone may indicate a positive tone, a neutral tone, or a negative tone. In additional examples, the system analyzer component 304 may determine a severity level based on the context data. The severity level may be determined based on comparing a metric in the report data to predetermined threshold values (e.g., a metric meets or exceeds 50), predetermined threshold ranges (e.g., a metric falls between 10 and 20), or historical value (e.g., a metric is higher than a previously recorded metric). The severity level may be expressed as a relative term including, but not limited to, extreme, strong, moderate, mild, weak, and the like. It is to be understood that although the tone and the severity level may be individually described and determined outside of the context data, the context data includes the tone and the severity level.

The subscriber database component 306 can include functionality to enable creating and storing user accounts. In some examples, the subscriber database component 306 may configure a user portal, to be presented on a display via a user device, to create a user account. The user portal prompts for user input to provide user information associated with the user account. The user account may be associated with one or more user devices and communication methods. Examples of communication methods may include, but are not limited to: a primary cell phone, a work cell phone, a personal email address, a work email address, and the like. Examples of user information may include, but are not limited to: name, identification, address, age, birthday, and the like.

The subscriber database component 306 may maintain a subscriber database to store and enable access to user accounts. The subscriber database component 306 and the notification system component 310 may enable a user to create a user account and allow the user account to be added as a subscriber to a list of notification subscribers. The subscriber database component 306 can store preferred communication methods for notifications with the user account. The subscriber database component 306 can receive and store additional user context data ("user context") with the user account. The user context may include, but is not limited to, user hobby, user interest, job title, and the like.

The authentication component 308 can include functionality to authenticate a user device to access user accounts and/or network services. In some examples, the subscriber database component 306 may configure a user portal to register a user account, and the authentication component 308 may authenticate a user device to access the user account. In some examples, the authentication component 308 may verify that a user account has permission to register as a notification subscriber for report data associated with a specific team or group and add the user account to the list of notification subscribers for the specific team or group. In some examples, the authentication component 308 may deactivate subscriber permission for a user account. For instance, if a user moves from a first team to a second team within a company, the user account may remain active, but the user account may no longer be a subscriber of reports for the first team.

The notification system component 310 may receive report data and handle notification transmission. In some instances, the notification system component 310 can correspond to the notification system component 108 of FIG. 1. As described herein with respect to the notification system component 108, the notification system component 310 may receive the report data and determine one or more user devices 104 to transmit the report data. The notification system component 310 may receive report data and generate notification alerts for the report data. A notification alert ("notification") may include any portion of the report data and/or a hyperlink to access the report data.

In some examples, the notification system component 310 may transmit the notification with an emotion-inciting image to a user device associated with a user account. The notification system component 310 may identify a user account associated with a subscriber ("user") from a list of notification subscribers. As described herein, the notification system component 310 may receive the report data, and the system may parse the report data for context data and identify an associated list of notification subscribers. The system may generate an emotion-inciting image based on the context data. The notification system component 310 may transmit the emotion-inciting image with the notification to a user device associated with a subscriber.

The notification system component 310 may enable a team to create team accounts and specify user accounts as notification subscribers. In some examples, the notification system component 310 and the subscriber database component 306 may configure a user portal for an entity and/or a team to create a group account and associated one or more user accounts as part of a list of notification subscribers. The notification system component 310 may receive instructions on data handling for the group account. The instructions may include, but are not limited to: group identifier, report data to be received and transmitted, a list of notification subscribers, priority contact rules for the list of notification subscribers, data policy, notification transmission schedule, and the like. In some examples, the priority contact rules for the list of notification subscribers may include rules to determine a primary contact for the notification based on conditions such as which user account is on call at time intervals on a specific day of the week. For instance, a network management team may determine to rotate a primary on-call person between the team members for handling after-hours networking issues, and the priority contact rules may indicate which notification subscribers to contact for each day of the week.

The notification system component 310 may determine one or more communication methods associated with the subscriber to transmit the notification. Based on the priority contact rules, the notification system component 310 may identify one or more notification subscribers to receive the notification. As described herein, the notification system component 310 may access the subscriber database component 306, determine a user account associated with an individual notification subscriber, and retrieve associated user data from the subscriber database component 306.

In additional examples, the notification system component 310 may select a communication method for the subscriber based on the priority contact rules. For example, a primary on-call user may receive a text notification, while a secondary on-call user may receive an email notification. In some examples, the notification system component 310 may determine to personalize the image only for the primary on-call user.

In various examples, the notification system component 310 may determine to modify an image quality based on communication method. In some examples, the notification system component 310 may determine to reduce an image quality based on the communication method and generate a reduced resolution image of the emotion-inciting image. For example, if the user is being notified by text, the system may downgrade the emotion-inciting image and transmit the reduced resolution image. In some examples, the notification system component 310 may determine to notify a primary contact by text and email and may downgrade the image for text while sending the original resolution image of the emotion-inciting image by email.

The notification system component 310 may include functionality to receive user feedback from the user device(s) in response to the notification. As described herein with respect to FIG. 2, the notification system component 210, via a user device 200, can send the user feedback with the notification to the serving device 300 to train models to improve the process for generating emotion-inciting images. As described herein, the system may include a feedback system to prompt user input to provide user feedback for the generated emotion-inciting image to rate whether the emotion-inciting image was appropriate for the content of the report data. In a non-limiting example, the user feedback may include but is not limited to: negative feedback, positive feedback, incorrect severity level, incorrect tone, inappropriate image, and the like. The notification system component 310 may collect user feedback to retrain the ML model(s) 314 to improve on any process, from analyzing report data to generating image text prompts.

The emotion-inciting image generator component 312 can include functionality to generate image text prompts corresponding to the content of the report data. In some instances, the emotion-inciting image generator component 312 can correspond to the emotion-inciting image generator component 110 of FIG. 1. As described herein with respect to the emotion-inciting image generator component 110, the emotion-inciting image generator component 312 may receive the report data and determine one or more user devices 104 to transmit a notification for the report data. The system analyzer component 304 and the emotion-inciting image generator component 312 may analyze the content of the report data and determine the context data.

In various examples, the emotion-inciting image generator component 312 may train one or more machine learning (ML) models ("model(s) 314") to generate emotion-inciting images based on the report data. In some examples, the emotion-inciting image generator component 312 may train the model(s) 314 to parse the report data to determine context data and generate image text prompts based on the context data. As described herein, the system analyzer component 304 may determine the context data based on predetermined metrics. Additionally and/or alternatively, the model(s) 314 may include a text parser to analyze the content of the report data and determine additional context data by analysis.

In some examples, the emotion-inciting image generator component 312, the notification system component 310, and the subscriber database component 306 may access a subscriber database to retrieve information associated with a subscriber to provide user context for image generation. The notification system component 310 may identify a user account associated with the notification subscriber and retrieve associated user data from the subscriber database. The emotion-inciting image generator component 312 may use the user data to determine additional context data. The additional context data may include, but is not limited to, user hobby, user interest, job title, subscriber notification priority (e.g., primary on-call, secondary on-call, etc.), and the like.

The emotion-inciting image generator component 312 may use context data to generate an image text prompt. In various examples, the emotion-inciting image generator component 312 may determine to use one or more context data, including the alert context, the user context, the tone, and the severity level, to generate an image text prompt. In some examples, the emotion-inciting image generator component 312 may include one or more preconstructed image text prompts. An admin user may configure the preconstructed image text prompt as "safe" images. The preconstructed image text prompt may be labeled by the tone and/or the severity level. In the present examples, the emotion-inciting image generator component 312 may determine to modify the image text prompt by replacing the generated image text prompt with a preconstructed image text prompt. For instance, if the report data is intended for recipients outside of the team, such as stakeholders of the project, the emotion-inciting image generator component 312 may determine using personalized images may be inappropriate and instead replace the generated image text prompt with one of the one or more preconstructed image text prompt that matches the tone and/or the severity level of the context data.

The emotion-inciting image generator component 312 and/or the notification system component 310 may use the image text prompt as input for an AI image generator and receive an emotion-inciting image as output. The notification system component 310 may generate a notification for the subscriber and transmit the notification with the emotion-inciting image to a user device 200 associated with the subscriber. In some examples, the notification system component 310 may cause the notification system component 210 residing on a user device 200 to present a user interface including the notification with the emotion-inciting image.

In some examples, the emotion-inciting image generator component 312 may use the contextual information of the report data to generate an image text prompt. In additional examples, the emotion-inciting image generator component 312 may use the image text prompt as input for an artificial intelligence (AI) image generator and receive an emotion-inciting image as output. The AI image generator may be an internal component or a third-party component.

In various examples, the emotion-inciting image generator component 312 may train one or more machine learning (ML) model(s) 314 using labeled data as training data. Machine learning generally involves processing a set of examples (called "training data") to train one or more model(s) 314. The model(s) 314, once trained, is a learned mechanism that can receive new data as input and generate a result as output. Additionally, model(s) 314 may output a confidence score associated with the result. The confidence score may be determined using probabilistic classification and/or weighted classification. For example, a trained ML model(s) 314 can comprise a classifier that is tasked with classifying unknown input as one of the multiple class labels. In additional examples, the model(s) 314 can be retrained with additional and/or new training data labeled with one or more new data types (e.g., context data type) to teach the model(s) 314 to classify unknown input by data types that may now include the one or more new data types.

In the context of the present disclosure, the input may include data that is to be handled according to its domain, report data, and/or context data, and the trained ML model(s) 314 may be tasked with receiving input data and generating an output image text prompt that connects the context data with the content of the report data. For instance, as described herein, the system may use a model that receives input report data and input context data, which includes data such as, "user loves cats," and the model can connect a negative tone and a high severity level to a cat lover. In the present examples, the model may determine that a highly negative context for a cat lover is a flaming litter box with an angry cat and output an image text prompt with "angry cat next to a litter box that is on fire."

In some examples, the notification system component 310 may receive user feedback for the generated emotion-invoking images, and the system may store the user feedback with the generated emotion-invoking image, the image text prompt, the context data, and the report data as additional training data to retrain the ML model(s) 314. In various examples, a user (e.g., an administrative staff, a data analyst, a team lead, etc.) may review the user feedback with the emotion-invoking image, the image text prompt, the context data, and the report data and flag which portion of the data as incorrect for retraining data. For instance, the user may determine the image text prompt resulted in an incorrectly generated emotion-invoking image or the context data indicated a negative tone while the image text prompt recited a positive tone. As described herein, model(s) 314 may adjust a weight associated with a data type. In a non-limiting example, the notification system component 310 may receive negative user feedback for the example image of "angry cat next to a litter box that is on fire" and the image was included with a quarterly budget report, the model(s) 314 may determine that an image of a cat with flaming litter box may be inappropriate for finance reports and decrease the weight for a first data type "user interest" when used in association with a second data type "finance reports." Accordingly, the system may retrain the ML model(s) 314 with the new training data to generate the new ML model(s) 314. The new ML model(s) 314 may be used to improve the process of generating new image text prompts as a continuous retraining cycle.

The ML model(s) 314 may represent a single model or an ensemble of base-level ML models and may be implemented as any type of model(s) 314. For example, suitable ML model(s) 314 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation-maximization, genetic algorithms, linear regression algorithms, nonlinear regression algorithms, logistic regression-based classification models, linear discriminant analysis (LDA), generative models, discriminative models, or an ensemble thereof. An "ensemble" can comprise a collection of the model(s) 314 whose outputs are combined, such as by using weighted averaging or voting. The individual ML models of an ensemble can differ in their expertise, and the ensemble can operate as a committee of individual ML models that are collectively "smarter" than any individual machine learning model of the ensemble.

In some embodiments, the processor(s) 316 is a central processing unit (CPU), a graphics processing unit (GPU), or both CPU and GPU, or other processing unit or component known in the art.

The serving device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and nonvolatile, removable and non-removable media implemented in any method or technology for storage of information, such as computer-readable instructions, data structures, program modules, or other data. Memory 302, removable storage 318, and non-removable storage 320 are all examples of computer-readable storage media. Computer-readable storage media may include non-transitory computer-readable storage media, which may include but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the serving device 300. Any such tangible computer-readable media can be part of the serving device 300.

The serving device 300 can include input device(s) 322, such as a keypad, a cursor control, a touch-sensitive display, etc. Also, the serving device 300 can include output device(s) 324, such as a display, speakers, etc. These devices are well-known in the art and need not be discussed at length here.

As illustrated in FIG. 3, the serving device 300 can include one or more wired or wireless transceiver(s) 326. In some wireless embodiments, to increase throughput, the transceiver(s) 326 can utilize multiple-input/multiple-output (MIMO) technology. The transceiver(s) 326 can be any sort of wireless transceiver(s) capable of engaging in wireless radio frequency (RF) communication. The transceiver(s) 326 can also include other wireless modems, such as a modem for engaging in Wi-Fi, WiMax, Bluetooth, infrared communication, or the like.

FIG. 4 illustrates an example user interface 400 presenting a notification including an emotion-inciting image generated by the notification system, as discussed herein. In some instances, the example user interface 400 can present various notifications, images, graphs, metrics, report data, and/or messages, including notification elements 402, 404, 406, and 408 in an environment. Further, the example user interface 400 can represent user interface buttons or other navigation elements to view additional notifications and accept user input to select and/or deselect individual notifications, as discussed herein.

In the first example, the notification element 402 may illustrate an example emotion-inciting image for the notification. As presented in the example user interface 400, the notification element 402 presents the example emotion-inciting image ahead of the content of the report data. As described herein, the present system, including the system analyzer component 304 and the notification system component 310, may analyze the report data for context data. The emotion-inciting image generator component 312 may use the context data to generate an image text prompt. The system may use the image text prompt as input for an AI image generator and receive the example emotion-inciting image as presented in notification element 402 as output. The notification element 402, as presented, is an image representation of a situation to entice an appropriate level of response from a user of the user device.

In the present example, the system, including the emotion-inciting image generator component 312, may determine that the context data indicated a strong negative tone due to a total system outage and generate an image text prompt of "dumpster engulfed in flames" to indicate that a recipient should be panicking to revive the system.

In an alternative example, the system analyzer component 304 and the notification system component 310 may analyze report data for context data and determine that a small feature of a new website rollout is responding too slowly. The emotion-inciting image generator component 312 may determine that the context data indicated a mildly negative tone due to a feature slowdown and generate an image text prompt of "dumpster" to indicate that the recipient should be aware of a potential issue but the situation is not as dire as a dumpster fire level.

In a second example, the notification element 404 may provide example graphs included with the report data. The notification element 406 may provide the remaining content of the report data. As described herein, the notification may include graphs and metrics to highlight relevant report data.

In a third example, the notification element 408 may provide example user feedback prompts. As described herein, the notification system component 310 may receive user feedback for the emotion-invoking image, and the system may store the user feedback with the emotion-invoking image, the image text prompt, the context data, and the report data as additional training data to retrain one or more models. In various examples, an analyst may review the user feedback with the emotion-invoking image, the image text prompt, the context data, and the report data and flag which portion of the data as incorrect for retraining data.

In the present example, an analyst may determine to tag the image text prompt as an incorrect emotion-invoking image because the example context data may actually indicate the new website rollout is successful and running faster than before, while the image text prompt recites "dumpster engulfed in flames," which is a hugely negative image. The system may use the tagged retraining data to generate a new ML model.

In some instances, the example user interface 400 can be generated and presented by the notification system components 108, 210, and 310, as discussed herein. Of course, the example visualizations are not limited to the example user interface 400. Further, the notification elements 402, 404, 406, or 408 are not limited to images, graphs, and report data and may include any additional data and/or interface elements for responding to the notification system.

Figure 5:
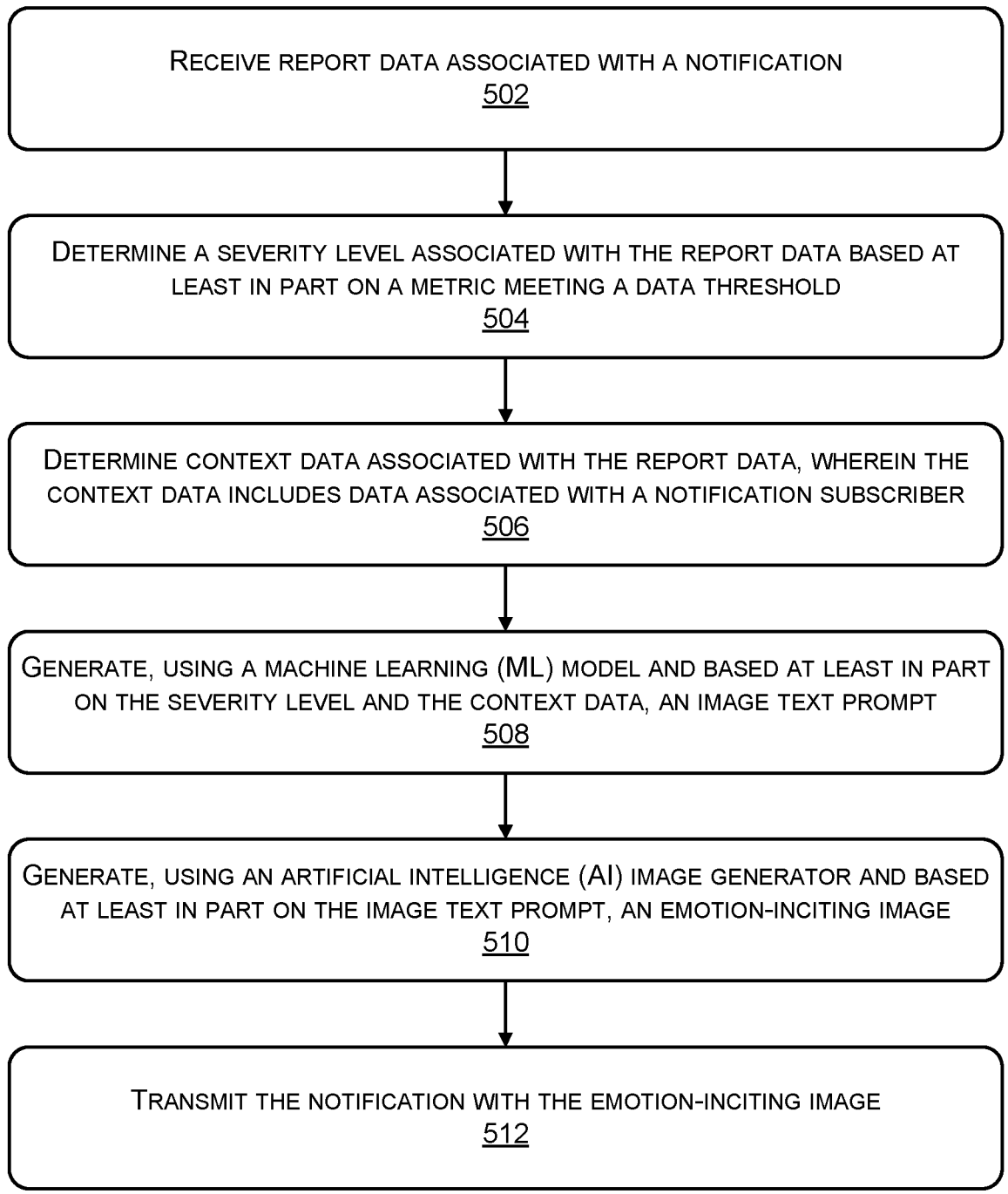
FIG. 5 illustrates an example process for generating notifications with emotion-inciting images based on the context of report data.
Figure 6:
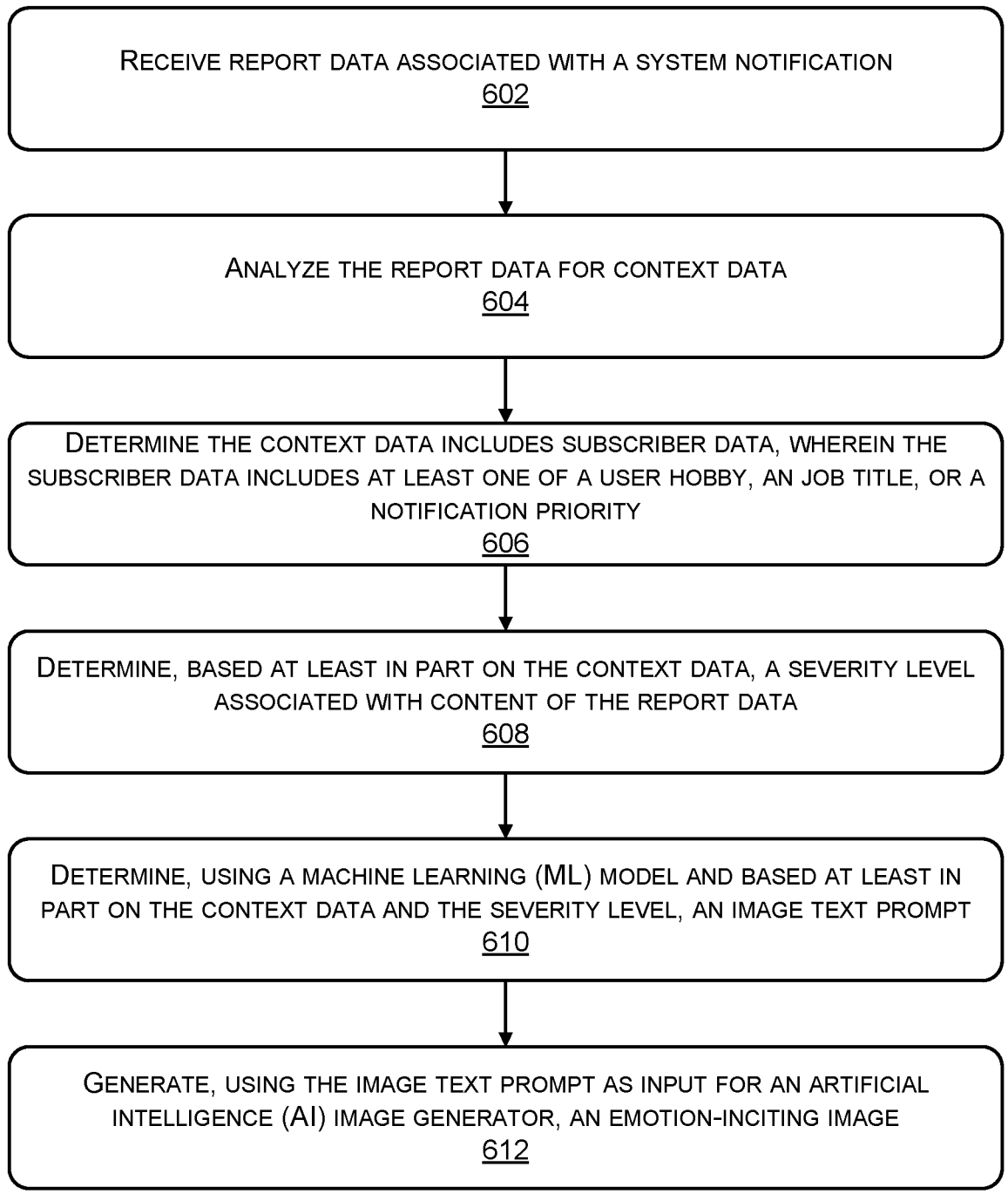
FIG. 6 illustrates an example process for generating notifications with emotion-inciting images based on the context of report data.

FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for generating notifications with emotion-inciting images based on context of report data, as described herein. The example process 500 can be performed by the serving device(s) 102 and 300 (or another component), in connection with the user device(s) 104 and 200 (or another component), and other components discussed herein. Some or all of the process 500 can be performed by one or more devices, equipment, or components illustrated in FIGS. 1-3, for example.

At operation 502, the process can include receiving report data associated with a notification. In some instances, the operation 502 can be performed by a serving device(s) using the system analyzer component 304, for example. In some instances, the system analyzer component can include functionality to receive and aggregate data, as discussed herein. The system analyzer component may receive data from internal data generated by the present system and/or from an external data reporting system. The system analyzer component may aggregate data as report data. The report data may include any data and/or metrics received and/or captured by any data reporting system. Examples of the report data may include, but are not limited to, network performance data, customer service data, air quality data, stock market profiles, political statistics, climate change data, and the like. The system analyzer component may include functionality to trigger an output of the report data. The triggering of output may include a manual trigger by a user requesting the report data and/or an automatic trigger in response to notification trigger conditions. The system analyzer component may store notification trigger conditions, which may include conditions based on data thresholds (e.g., percentage of system failure, data transmission rate falling below a value, etc.), meeting a set of conditions (e.g., completion of a set of tasks), and/or time intervals (e.g., biweekly, quarter, etc.).

At operation 504, the process can include determining a severity level associated with the report data based at least in part on a metric meeting a data threshold. In some instances, the operation 504 can be performed by a serving device using the system analyzer component 304 and the notification system component 310, for example. The system analyzer component can analyze report data and determine context data. In some examples, the system analyzer component may store metrics ("data values") templates to identify metrics and associated values that provide relevant information in the content of the report data for contextual information. In additional examples, the metrics templates may include rules or formulas to apply the associated values to for determining whether the data indicate a negative or positive trend and/or severity levels. In additional examples, the system analyzer component may analyze any data trends, behavior patterns, or correlated data to determine significance and/or provide additional context data ("context data"). The context data may include any data associated with contextual information of the report data and may include but is not limited to: alert context, tone, severity level, notification policy, and the like. Examples of the alert context may include, but are not limited to: knowledge domain, report type, report audience, department information, and the like. In some examples, the system analyzer component can determine an interpreted tone ("tone") based on the context data, wherein the tone may indicate a positive tone, a neutral tone, or a negative tone. In additional examples, the system analyzer component may determine a severity level based on the context data. The severity level may be determined based on comparing a metric in the report data to predetermined threshold values (e.g., a metric meets or exceeds 50), predetermined threshold ranges (e.g., a metric falls between 10 and 20), or historical value (e.g., a metric is higher than a previously recorded metric).

At operation 506, the process can include determining context data associated with the report data, wherein the context data includes data associated with a notification subscriber. In some instances, the operation 506 can be performed by a serving device using the subscriber database component 306 and the notification system component 108 or 310, for example. The subscriber database component may maintain a subscriber database to store and enable access to user accounts. The subscriber database component can enable the notification system component to look up a user account and allow the user account to be associated with a notification subscriber. The subscriber database component can store preferred communication methods for notifications with the user account. The subscriber database component can receive and store additional user context data ("user context") with the user account. The user context may include, but is not limited to, user hobby, user interest, job title, and the like.

At operation 508, the process can include generating, using a machine learning (ML) model and based at least in part on the severity level and the context data, an image text prompt. In some instances, the operation 508 can be performed by a serving device using the system analyzer component 304, the notification system component 108 or 310, and the emotion-inciting image generator component 110 or 312, for example. The emotion-inciting image generator component may train machine learning (ML) model(s) to generate an image text prompt based on the report data and the context data. As described herein, the system analyzer component may determine the context data based on predetermined metrics. In some examples, the ML model(s) may include a text parser to analyze the content of the report data and determine context data. In the context of the present disclosure, an input may include data that is to be handled according to its domain, report data, and/or context data. The trained ML model(s) may be tasked with receiving input data and generating an output image text prompt that connects the context data with the content of the report data. For instance, as described herein, the system may use a model that receives input report data and input context data, which includes data such as, "user loves cats," and the model can connect a negative tone and a high severity level to a context of cat lover. In the present examples, the model may determine that a highly negative situation for a cat lover is a flaming litter box with an angry cat and output an image text prompt with "angry cat next to a litter box that is on fire."

At operation 510, the process can include generating, using an artificial intelligence (AI) image generator and based at least in part on the image text prompt, an emotion-inciting image. In some instances, the operation 510 can be performed by a serving device using the notification system component 108 or 310, for example. As described herein, the emotion-inciting image generator component and/or the notification system component may use the image text prompt as input for an AI image generator and receive an emotion-inciting image as output. The notification system component may generate a notification for the subscriber and transmit the notification with the emotion-inciting image.

At operation 512, the process can include transmitting the notification with the emotion-inciting image. The operation 512 can be performed by a serving device using the notification system component 108 or 310, for example. The notification system component may generate a notification for the subscriber and transmit the notification with the emotion-inciting image to a user device 200 associated with the subscriber. In some examples, the notification system component 310 may cause the notification system component 210 residing on a user device 200 to present a user interface including the notification with the emotion-inciting image.

FIG. 6 illustrates an example process 600 for generating notifications with emotion-inciting images based on the context of report data, as described herein. The example process 600 can be performed by serving device(s) 102 and 300 (or another component), in connection with the user device(s) 104 and 200 (or another component), and other components discussed herein. Some or all of the process 600 can be performed by one or more devices, equipment, or components illustrated in FIGS. 1-3, for example.

At operation 602, the process can include receiving report data associated with a system notification. In some instances, the operation 602 can be performed by a serving device(s) using the system analyzer component 304, for example. In some instances, the system analyzer component can include functionality to receive and aggregate data, as discussed herein. The system analyzer component may aggregate data as report data. The report data may include any data and/or metrics received and/or captured by any data reporting system. Examples of the report data may include, but are not limited to, network performance data, customer service data, air quality data, stock market profiles, political statistics, climate change data, and the like. The system analyzer component may include functionality to trigger an output of the report data. The triggering of output may include a manual trigger by a user requesting the report data and/or an automatic trigger in response to notification trigger conditions. The system analyzer component may store notification trigger conditions, which may include conditions based on data thresholds (e.g., percentage of system failure, data transmission rate falling below a value, etc.), meeting a set of conditions (e.g., completion of a set of tasks), and/or time intervals (e.g., biweekly, quarter, etc.).

At operation 604, the process can include analyzing the report data for context data. In some instances, the operation 604 can be performed by a serving device(s) using the system analyzer component 304, for example. In some instances, the system analyzer component can include functionality to receive and aggregate data, as discussed herein. The system analyzer component may receive data from internal data generated by the present system and/or external data from an external data reporting system. The system analyzer component can analyze report data and determine context data. In some examples, the system analyzer component may store metrics ("data values") templates to identify metrics and associated values that provide relevant information in the content of the report data for contextual information. In additional examples, the metrics templates may include rules or formulas to apply the associated values to for determining whether the data indicate a negative or positive trend and/or severity levels. In additional examples, the system analyzer component may analyze any data trends, behavior patterns, or correlated data to determine significance and/or provide additional context data ("context data"). The context data may include any data associated with contextual information of the report data and may include but is not limited to: alert context, tone, severity level, notification policy, and the like. Examples of the alert context may include, but are not limited to: knowledge domain, report type, report audience, department information, and the like.

At operation 606, the process can include determining the context data includes subscriber data, wherein the subscriber data includes at least one of a user hobby, a job title, or a notification priority. The operation 606 can be performed by a serving device using the subscriber database component 306 and the notification system component 108 or 310, for example. The subscriber database component may maintain a subscriber database to store and enable access to user accounts. The subscriber database component can enable the notification system component to look up a user account and allow the user account to be associated with a notification subscriber. The subscriber database component can store preferred communication methods for notifications with the user account. The subscriber database component can receive and store additional user context data ("user context") with the user account. The user context may include, but is not limited to, user hobby, user interest, job title, and the like. The notification system component may receive instructions on data handling for the team. The instructions may include, but are not limited to: report data to be received and transmitted, notification subscribers, priority contact rules for the notification subscribers, data policy, notification transmission schedule, and the like. In some examples, the priority rules for the notification subscribers may include rules to determine a primary contact for the notification based on conditions, such as who is on call at time intervals on a specific day of the week.

At operation 608, the process can include determining, based at least in part on the context data, a severity level associated with content of the report data. In some instances, the operation 608 can be performed by a serving device using the subscriber database component 306 and the notification system component 108 or 310, for example. In some examples, the system analyzer component can determine an interpreted tone ("tone") based on the context data, wherein the tone may indicate a positive tone, a neutral tone, or a negative tone. In additional examples, the system analyzer component may determine a severity level based on the context data.

At operation 610, the process can include determining, using a machine learning (ML) model and based at least in part on the context data and severity level, an image text prompt. The operation 610 can be performed by a serving device using the system analyzer component 304, the notification system component 108 or 310, and the emotion-inciting image generator component 110 or 312, for example. The emotion-inciting image generator component may train machine learning (ML) model(s) to generate an image text prompt based on the report data and the context data. As described herein, the system analyzer component may determine the context data based on predetermined metrics. In some examples, the ML model(s) may include a text parser to analyze the content of the report data and determine context data. In the context of the present disclosure, an input may include data that is to be handled according to its domain, report data, and/or context data. The trained ML model(s) may be tasked with receiving input data and generating an output image text prompt that connects the context data with the content of the report data. For instance, as described herein, the system may use a model that receives input report data and context data, which indicates "user loves cats." The model can connect a negative tone and a high severity level to a cat lover. In the present examples, the model may determine that a highly negative context for a cat lover is a flaming litter box with an angry cat and output an image text prompt with "angry cat next to a litter box that is on fire."

At operation 612, the process can include generating, using the image text prompt as input for an artificial intelligence (AI) image generator, an emotion-inciting image. In some examples, the operation 612 can be performed by a serving device using the notification system component 108 or 310. As described herein, the emotion-inciting image generator component and/or the notification system component may use the image text prompt as input for an AI image generator and receive an emotion-inciting image as output. The notification system component may generate a notification for the subscriber and transmit the notification with the emotion-inciting image.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer executable instructions that, when executed, cause one or more processors to perform operations comprising:
   receiving report data associated with a notification system;
   determining one or more notification subscribers to receive a notification alert for the report data;
   determining first context data of context data associated with the one or more notification subscribers, wherein the first context data includes one or more of a user hobby, a job title, and a notification priority;
   determining, by using the report data and the context data as input for one or more machine learning (ML) models, image text prompt for an artificial intelligence (AI) image generator, including:
   determining, by the one or more ML models, second context data of context data associated with the report data, wherein the second context data includes one or more of a department information, a report type, and a report audience;
   determining, by the one or more ML models, an interpreted tone of the report data, wherein the interpreted tone indicates one or more of a positive tone, a negative tone, and a severity level;
   generating, using the AI image generator with the image text prompt as input, an emotion-inciting image; and
   transmitting the notification alert with the emotion-inciting image.

2. The one or more non-transitory computer-readable media of claim 1, wherein determining the second context data comprises:
   determining to retrieve a user profile associated with the one or more notification subscribers;
   receiving, from a subscriber database, the user profile; and determining to analyze the user profile for identifying the second context data.

3. The one or more non-transitory computer-readable media of claim 1, wherein the operations further comprise:
determining a system policy based on the department information; and
determining, based at least in part on the system policy, to modify the image text prompt.

4. The one or more non-transitory computer-readable media of claim 1, wherein the operations further comprise:
receiving user feedback for the emotion-inciting image; and
storing the user feedback with the report data, the image text prompt, and the emotion-inciting image as training data.

5. The one or more non-transitory computer-readable media of claim 4, wherein the operations further comprise:
determining to retrain the one or more ML models using the training data.

6. A method comprising:
receiving report data associated with a notification system;
determining a subscriber account to receive a notification alert for the report data;
determining first context data of context data associated with the subscriber account;
determining, by one or more machine learning (ML) models based at least in part on a content of the report data, second context data of context data;
determining, by the one or more machine learning (ML) models based at least in part on the report data, an interpreted tone of the report data, wherein the interpreted tone indicates one or more of a positive tone, a negative tone, and a severity level;
determining, by the one or more machine learning (ML) models based at least in part on the context data and the interpreted tone, image text prompt for an artificial intelligence (AI) image generator; and
generating, by the AI image generator with the image text prompt as input, an emotion-inciting image.

7. The method of claim 6, wherein transmitting the notification alert further comprises:
determining a communication method for the notification alert;
determining, based at least in part on the communication method, to generate a reduced resolution image of the emotion-inciting image; and
transmitting the notification alert with the reduced resolution image.

8. The method of claim 6, further comprising:
transmitting the notification alert with the emotion-inciting image;
receiving user feedback for the emotion-inciting image; and
storing the user feedback with the report data, the image text prompt, and the emotion-inciting image as training data.

9. The method of claim 8, further comprising:
generating one or more second ML models using the training data, wherein the one or more second ML models adjusts one or more weights associated with one or more context data.

10. The method of claim 6, wherein the severity level is determined based at least in part by meeting a predetermined threshold value range.

11. The method of claim 6, wherein the severity level is determined based at least in part by exceeding a historical threshold value.

12. The method of claim 6, wherein the context data includes one or more of a user hobby, a job title, a notification priority, a department information, a report type, and a report audience.

13. The method of claim 12, further comprising:
determining a system policy based on the department information; and
determining, based at least in part on the system policy, to modify the image text prompt.

14. A system comprising:
one or more processors;
a memory; and
one or more components stored in the memory and executable by the one or more processors to perform operations comprising:
receiving report data associated with a notification system;
determining a subscriber account to receive a notification alert for the report data;
determining first context data of context data associated with the subscriber account, wherein the first context data includes one or more of a user hobby, a job title, and a notification priority;
determining, by an image-generating model based at least in part on the report data, second context data of context data associated with the report data, wherein the second context data includes one or more of a department information, a report type, and a report audience;
determining, by the image-generating model based at least in part on the report data, an interpreted tone of the report data, wherein the interpreted tone indicates one or more of a positive tone, a negative tone, and a severity level;
determining, by the image-generating model based at least in part on the context data and the interpreted tone, image text prompt for an artificial intelligence (AI) image generator; and
generating, by the AI image generator with the image text prompt as input, an emotion-inciting image.

15. The system of claim 14, wherein determining the first context data comprises:
determining to retrieve a user profile associated with the subscriber account;
receiving, from a subscriber database, the user profile; and
determining a preferred communication method associated with the subscriber account.

16. The system of claim 15, wherein the preferred communication method indicates one of text messaging, email, and notification portal.

17. The system of claim 16, the operations further comprising:
determining to modify image quality of the emotion-inciting image based at least in part on the preferred communication method; and
transmitting the notification alert with the emotion-inciting image.

18. The system of claim 14, wherein the severity level is determined based at least in part on meeting or exceeding a threshold value.

19. The system of claim 14, the operations further comprising:
transmitting the notification alert with the emotion-inciting image;

receiving user feedback for the emotion-inciting image; and storing the user feedback with the report data, the image text prompt, and the emotion-inciting image as training data.

20. The system of claim 19, the operations further comprising:

generating one or more second machine learning (ML) models using the training data, wherein the one or more second ML models adjusts one or more weights associated with one or more context data.

* * * * *